Dec. 29, 1953  G. RATHMAN  2,664,304
AUTOMATICALLY BALANCED ROTOR ASSEMBLY
Filed Dec. 20, 1950  2 Sheets-Sheet 1
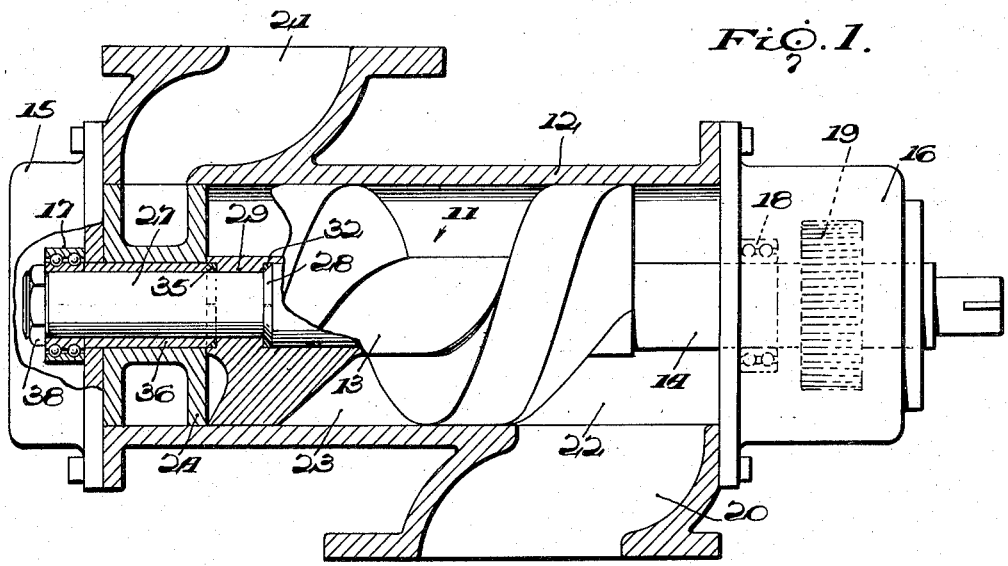
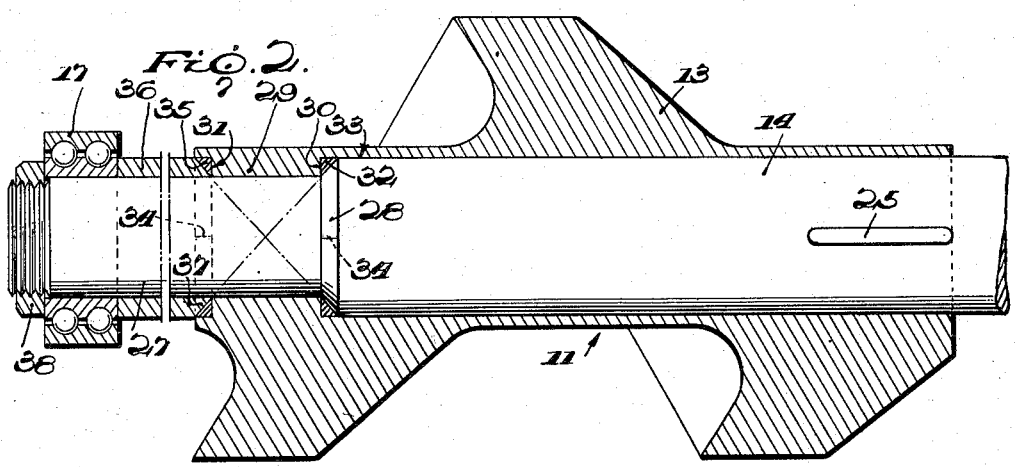
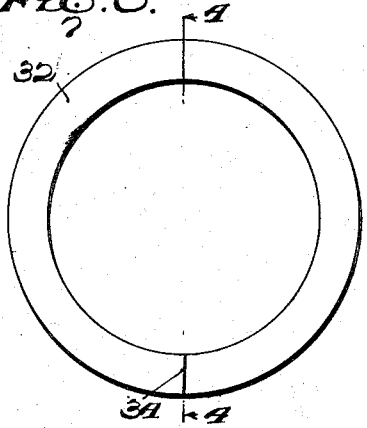
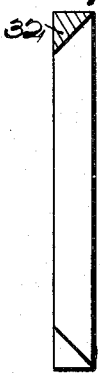
INVENTOR
Gilbert Rathman
BY
Cameron, Kerkam & Sutton
ATTORNEYS Dec. 29, 1953  G. RATHMAN  2,664,304
AUTOMATICALLY BALANCED ROTOR ASSEMBLY
Filed Dec. 20, 1950  2 Sheets-Sheet 2
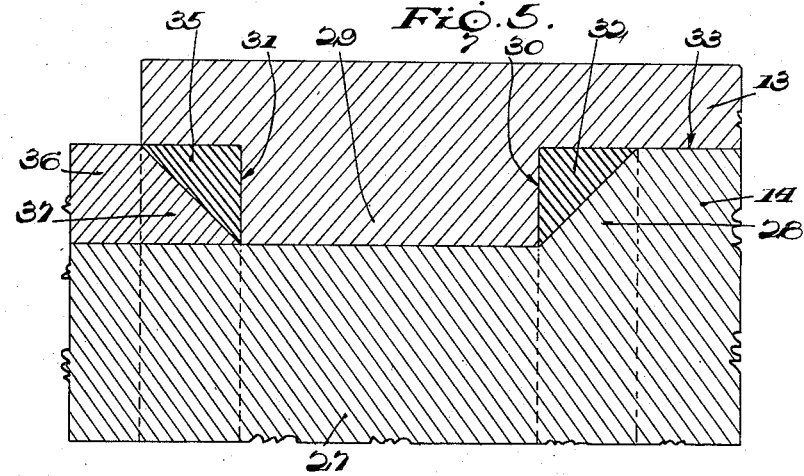
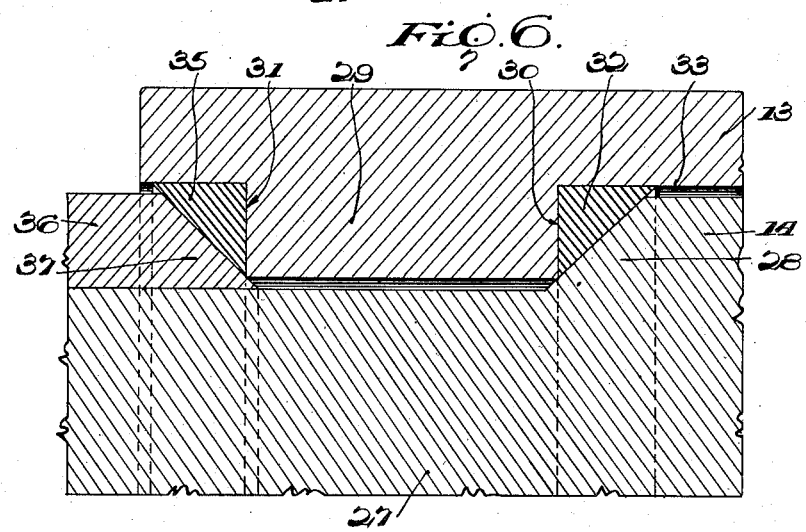
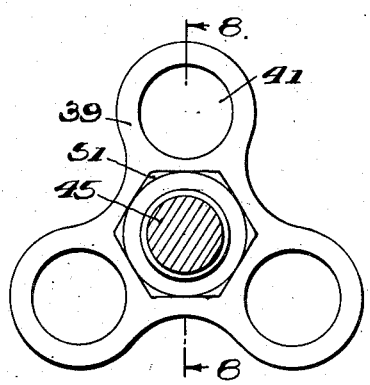
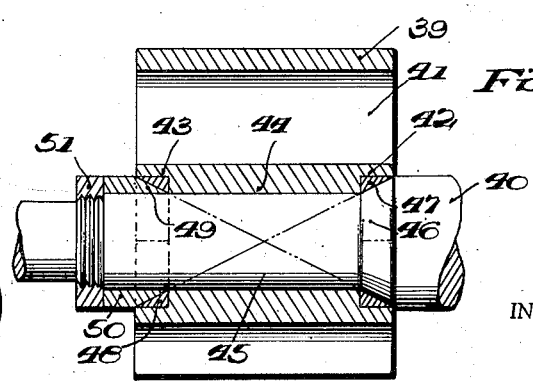
INVENTOR
Gilbert Rathman
BY
Cameron, Kerkam + Sutton
ATTORNEYS

Patented Dec. 29, 1953

2,664,304

UNITED STATES PATENT OFFICE 2,664,304

AUTOMATICALLY BALANCED ROTOR ASSEMBLY

Gilbert Rathman, Union, N. J., assignor, by mesne assignments, to Dresser Industries, Inc., a corporation of Pennsylvania Application December 20, 1950, Serial No. 201,828

12 Claims. (Cl. 287—52)

This invention relates to the balancing of rotors subjected to relatively high temperatures during use which include elements formed of materials having different coefficients of thermal expansion, and has particular application to pumps, blowers, compressors and similar devices for handling hot gases which embody rotor bodies of aluminum or other relatively high expansion metal mounted on steel shafts.

Considering, by way of example, a rotary blower or compressor of the positive displacement type having an aluminum rotor body mounted on a steel shaft, it has been found that, when such a device is used for blowing hot gas or for compressing gas to relatively high pressures, the heat of the gas causes the aluminum rotor body to expand more than the steel shaft and to become loose thereon, thereby unbalancing the rotor assembly. In the case of an axial flow machine, the undesirable effects of the unbalance are aggravated because the expansion of the parts will be greater at one end of the rotor than at the other.

It is therefore the principal object of the present invention to provide novel means for automatically maintaining the rotative balance of rotor assemblies for fluid handling apparatus which embody metal parts having different heat expansion characteristics and which are exposed to relatively high temperatures during operation.

Another object is to provide a unique construction for centering the rotor body and shaft of a rotary gas pump or similar device which is so designed as to automatically correct any unbalance in the rotor assembly due to unequal expansion of the parts.

A further object is to provide a mechanically simple self-centering connection between a separately formed rotor body and its shaft which effectively prevents the rotor body from becoming loose on the shaft in the event that the bore of said body should become larger than the shaft under the influence of heat.

These and other objects will appear more fully upon consideration of the detailed description of the embodiments of the invention which follows. Although only to specific examples of structures incorporating the invention are described and illustrated in the accompanying drawings, it is to be expressly understood that these drawings are for the purpose of illustration only and are not to be construed as defining the scope of the invention, for which latter purpose reference should be had to the appended claims.

Referring now to the drawings, wherein like reference characters indicate like parts throughout the several views:

Fig. 1 is a plan view, with the casing and a portion of the upper rotor shown in section, of a rotary compressor of the positive displacement, helically ribbed rotor type embodying the novel automatically balanced construction of the present invention;

Fig. 2 is a horizontal axial section, on an enlarged scale, of the rotor assembly of Fig. 1 with the shaft shown in full and the parts in their normal, unexpanded positions;

Fig. 3 is an end elevation, on a further enlarged scale, of one of the split rings which serve to maintain the rotor body centered with respect to the shaft;

Fig. 4 is a cross section of the ring of Fig. 3 taken on line 4—4 in the latter figure;

Fig. 5 is an enlarged fragmentary axial sectional view of the automatic balancing structure of Fig. 2 showing the parts in the positions which they occupy under normal temperature conditions;

Fig. 6 is a view similar to Fig. 5, but showing the parts in the positions occupied when subjected to a relatively high temperature;

Fig. 7 is an end elevation of a Roots type rotor embodying the automatically balanced construction of the present invention; and Fig. 8 is a vertical axial section, with the shaft shown in full, of the rotor assembly of Fig. 7 taken on line 8—8 in the latter figure.

The device illustrated in Fig. 1, representing one form of gas handling apparatus wherein the balancing arrangement of the present invention finds particular utility, is a rotary screw type compressor of the character disclosed in my prior Patent No. 2,511,878, dated June 20, 1950. In such a device, the detailed construction of which may be readily ascertained from my aforesaid patent, a pair of helically ribbed rotors 11 (only one of which can be seen in the plan view of Fig. 1, the second rotor being beneath that shown) are rotatably supported in a casing 12 in intermeshed relationship, each rotor assembly including a body portion 13, which is formed with a single screw thread having a running fit in the casing 12, and a shaft 14 which extends outwardly through the ends of the casing into detachable heads 15 and 16 wherein are mounted combination radial and end thrust bearings 17 and 18 for the shaft. The shaft 14 of the upper rotor projects outwardly of the casing head 16 and is adapted to be connected to a suitable source of power for driving the compressor, the driving torque being transmitted from the upper rotor to the lower one through timing gears 19 housed in the casing head 16.

The casing 12 is provided at one end (the right-hand end as viewed in Fig. 1) with a laterally extending intake conduit 20 and at the other end with an oppositely extending discharge conduit 21. The air or other gas to be compressed is supplied from the intake conduit 20 directly to a relatively large intake chamber 22 which is in permanent communication with the intake end of the gas transporting and compressing space 23 defined by the rotor threads and the surrounding wall of the casing 12. As the rotors turn, the gas is advanced by the rotor threads toward the left as viewed in Fig. 1 and, as the compressing space 23 gradually decreases in volume, is compressed against the inner vertical wall of a hollow casting 24 which is removably fitted into the discharge end of the casing 12 and is provided with a suitable port (not shown) through which the compressed gas is intermittently delivered to the discharge conduit 21 in the manner disclosed in my previously mentioned Patent No. 2,511,878.

The rotor body 13 of each rotor 11 is preferably formed separately from its shaft 14 and fixed thereto for rotation therewith in any suitable manner, as by a key and keyway connection indicated at 25 in Fig. 2.

In certain installations, particularly where the rotors are of relatively large diameter and weight is an important factor, it is desirable that the screw threaded rotor bodies be made of a relatively light material, such as aluminum, even though the rotor shafts are made of steel. In a rotor assembly of this character, the heat generated by compression of the gas causes the aluminum rotor body to expand more than the steel shaft, particularly that portion of the rotor body adjacent the discharge end of the casing, with the result that the body becomes loose on the shaft and the rotor assembly is unbalanced. In order to remedy this defect in prior structures of the character described, novel means have been provided by the present invention for automatically maintaining the rotative balance of the rotor assembly in spite of the unequal expansion of the parts thereof under the influence of high temperatures.

In the embodiment illustrated in Figs. 1–6, a self-centering connection is provided between the rotor body 13 and shaft 14 at the discharge end of the rotor assembly which is so constructed that, although the aluminum rotor body may expand at an appreciably greater rate than the steel shaft when subjected to elevated temperatures, the two elements of the assembly are maintained coaxial with one another and no looseness is permitted to develop.

As shown best in Figs. 2, 5 and 6, the shaft 14 has a portion 27 of reduced diameter at the discharge or hot end of the rotor assembly which extends into the bore of the rotor body 13 for a substantial distance, there being an inclined or beveled shoulder 28 between the reduced diameter portion 27 and the main part of the shaft. The end of the rotor body 13 which surrounds the reduced portion 27 of the shaft is provided with an inwardly projecting, straight-sided annular collar 29 of substantial axial extent, the internal diameter of said collar being such that, when the parts are subjected to normal temperatures, on the order of 70° F., the collar fits tightly about the reduced portion of the shaft. The collar 29 is so positioned that its inner or right-hand radial edge 30 normally lies in substantially the same diametral plane as the junction between the reduced portion 27 and the inclined shoulder 28 of the shaft, while the outer or left-hand edge 31 of said collar is spaced inwardly from the outer end of the rotor body 13 by a distance substantially equal to the axial length of the shoulder 28.

Interposed between the shaft shoulder 28 and the surrounding portion of the rotor body is a split ring 32 having a triangular cross section of such shape and size that, at normal temperatures when the assembly is cool, the ring substantially fills the annular space defined by the beveled surface of shoulder 28, the inner radial edge 30 of the collar 29 and the axial bore 33 of the rotor body. As indicated in Figs. 2 and 3, the split 34 in ring 32 lies in a radial plane through the axis of the shaft, and when the parts are originally assembled, the portions of the ring on opposite sides of the split are in end-to-end contact. A second split ring 35, identical with ring 32 except that its beveled edge faces to the left instead of to the right, is housed in the annular recess in the end of the rotor body 13 abutting the outer or left-hand radial edge 31 of the collar 29, and is held in place by a sleeve 36 which surrounds the reduced portion 27 of the shaft between the outer end of the rotor body and the bearing 17 in the casing head 15. The inner or right-hand end of sleeve 36 is provided with an inclined or beveled shoulder 37 of the same angularity as, but sloping oppositely to, the shoulder 28 on the shaft so as to cooperate with the beveled edge of the second split ring 35 in the same manner as the shaft shoulder 28 cooperates with the first split ring 32. The rotor body 13, shaft 14, split rings 32 and 35, sleeve 36 and the inner race of bearing 17 are held together in assembled, relatively non-rotatable relationship by a nut 38 which is threaded onto the outer end of shaft portion 27 and abuts said inner bearing race.

The split rings 32 and 35 and sleeve 36 are preferably made of the same material as the shaft 14 and its reduced portion 27, steel of 300 Brinell hardness being an appropriate material for all of these elements when the rotor body 13 is of aluminum. In any event, the metal of the split rings and sleeve should have a coefficient of thermal expansion which is at least equal to that of the shaft metal and not greater than that of the rotor body.

The angularity of the shoulders 28 and 37 on the shaft and sleeve, respectively, and that of the beveled edges of the spit rings 32 and 35 is determined by the relationship between the diameter of the reduced portion 27 of the shaft and the axial length of the collar 29 of the rotor body. As indicated in broken lines in Fig. 2, the angularity of these inclined surfaces may be represented by the diagonals of a rectangle having adjacent sides equal to the diameter of shaft portion 27 and the axial length of collar 29, respectively. Mathematically, the value of the angle of inclination of the shoulders 28 and 37 with respect to the outer surface of the reduced shaft portion 27, which is also the angle of the outer corners of the split rings 32 and 35, may be derived from the formula $\tan A = D/L$, where A is the angle in question, D is the diameter of the shaft portion 27 and L is the axial length of the collar 29. In the structure illustrated in Figs. 1–6, this angle may conveniently be established at 45°, although it is evident that the angularity may be varied, as desired.

The method of operation of the unique selfbalancing rotor assembly of the present invention will be evident from a comparison between the showings of Figs. 5 and 6 which indicate the relative positions of the elements (a) at normal temperatures on the order of 70° F., and (b) when subjected to a relatively high temperature on the order of 300° F. In Fig. 5, which represents the at rest condition of the assembly, the parts are cool and the rotor body 13 has a tight fit with respect to the shaft 14 and its reduced portion 27. When the compressor is in operation, the heat of the compressed gas at the discharge end of the device raises the temperature of the rotor parts, and, due to the difference in thermal expansion of the aluminum rotor body and steel shaft, the bore 33 of the rotor body and the inside diameter of its collar 29 become larger than the outside diameters of the main shaft 14 and reduced portion 27, as shown in Fig. 6; and were it not for the means provided by the present invention, the hot end of the rotor body would become loose on the shaft and the rotor assembly would be unbalanced. However, as the hot end of the rotor body expands diametrically so as to increase the size of the bore, it simultaneously undergoes an axial expansion, including the collar 29; and as the collar expands axially, it moves the spit rings 32 and 35 away from one another and, due to the inclination of the contacting surfaces of said rings and the beveled shoulders 28 and 37, and by virtue of the spit construction of the rings, also expands the latter and forces them to ride up on the shoulders. In this manner, the outer circumferential surfaces and the perpendicular side edges of the rings are maintained in contact with the bore 33 of the rotor body and the radial edges 30 and 31 of the collar 29, respectively, while their beveled side edges remain in contact with the shoulders 28 and 37, thus forming a solid, self-centering connection between the parts which prevents any looseness between the rotor body and the shaft and consequent unbalancing of the rotor assembly.

Figs. 7 and 8 indicate how the invention may be applied to the rotor of a Roots type gas handling apparatus wherein the flow of gas is radial, rather than axial, with respect to the rotors. When a device of this character is used for pumping hot gases, and the rotor body and shaft are formed of different metals, the same problem of unequal expansion is encountered as in an axial flow compressor of the type previously described, although in the Roots type apparatus there is no appreciable temperature difference between the opposite ends of the rotor.

The structure illustrated in Figs. 7 and 8 represents one of the rotors of a Roots type, positive displacement pump or blower, such as that shown in Houghton Patent No. 2,489,887, dated November 29, 1949, and comprises a three-lobed impeller or rotor body 39 of a relatively light material, such as aluminum, which is keyed or otherwise suitably connected to a steel shaft 40 for rotation thereby. In order to further lighten the weight of the rotor assembly, each of the impeller lobes may be cored as indicated at 41. In accordance with the invention, the rotor body 39 is automatically maintained concentric with the shaft 40, in spite of unequal expansion of the parts under the influence of elevated temperatures, by mounting said body on the shaft in a manner similar to that above described in connection with the structure of Figs. 1-6.

As shown, the hub portion of the rotor body 39 is annularly recessed at both ends as indicated at 42 and 43 so that the central part 44 of the hub is similar in character to the collar 29 of the previously described embodiment. The annular central part 44 of the hub projects radially inwardly and normally has a tight fit on the reduced diameter portion 45 of the shaft 40, there being an inclined shoulder 46 between the reduced portion 45 and the remainder of the shaft, which shoulder lies within the recess 42 in the right-hand end of the rotor body 39. Interposed between the shoulder 46 and the walls of the recess 42 is a split ring 47 beveled at one edge to the same angle as said shoulder. A second split ring 48 is housed in the recess 43 at the left-hand end of the rotor body and cooperates with a beveled shoulder 49 on the end of a sleeve 50 surrounding the reduced shaft portion 45 similarly to ring 47 and shoulder 46. The rotor body 39, split rings 47 and 48 and sleeve 50 are held in assembled, relatively non-rotatable relationship with the shaft 40 and its reduced portion 45 by a nut 51 which is threaded onto the shaft portion 45 and abuts the outer end of sleeve 50.

The split rings 47 and 48 and associated shoulders 46 and 49 on the shaft and sleeve, respectively, operate to automatically maintain the balance of the rotor assembly in the same manner as the corresponding elements of the structure of Figs. 1-6. It will also be evident from Fig. 8 that the angularity of the inclined surfaces of said element is determined in the same manner as that previously described, in that the tangent of said angle is equal to the ratio between the diameter of the reduced shaft portion 45 and the axial length of the central part 44 of the hub of the rotor body.

There is thus provided by the present invention a novel construction for automatically correcting any tendency toward unbalance in rotor assemblies of composite construction resulting from unequal expansion of the parts when subjected to relatively high temperatures. The structure of the invention is relatively simple from a mechanical standpoint, easily manufactured and installed, and dependable in operation. It is adaptable to a wide variety of rotary machines wherein it is desirable to utilize rotor bodies and shafts made of metals having different heat expansion characteristics which give rise to unbalance under elevated temperature conditions, although it finds particular utility in connection with bimetallic rotor assemblies for gas handling apparatus of the character above described.

While two specifically different forms of the invention have been illustrated in the accompanying drawings, it will be obvious that the inventive concept is not limited to the particular structures shown, but is capable of a variety of mechanical embodiments. For example, when a screw type apparatus of the form shown in Figs. 1-6 is used to pump or transport hot gases without effecting any compression therein, the internal shoulder of the rotor body may extend substantially the full length thereof so that the split rings are located at opposite ends of the rotor body, similarly to the Roots type rotor of Figs. 7 and 8. Furthermore, in such a construction, or in that of Figs. 7 and 8, the beveled shoulder at the right-hand end of the assembly, which is shown as being formed on the shaft itself, could obviously be formed on a removable sleeve similar to that used at the left-hand end of the rotor. It will also be evident that the parts may be made of materials other than aluminum and the specific grade of steel above mentioned, as long as the rotor body has a higher coefficient of thermal expansion than the shaft on which it is mounted.

Various other changes, which will now suggest themselves to those skilled in the art, may be made in the form, details of construction and arrangement of the parts without departing from the spirit of the invention. Reference is therefore to be had to the appended claims for a definition of the limits of the invention.

What is claimed is:

1. A rotor assembly comprising a shaft, a separately formed rotor body mounted on said shaft for rotation therewith, said shaft and rotor body being formed of different materials having different coefficients of thermal expansion, and means including at least one annular element interposed between said rotor body and shaft and displaceable both radially and axially relative to said shaft in response to the difference in thermal expansion of said rotor body and shaft for maintaining the latter in rotatively balanced relationship.

2. A rotor assembly comprising a shaft, a separately formed rotor body mounted on said shaft for rotation therewith, said rotor body being formed of a material having a higher coefficient of thermal expansion than that of said shaft, and means including at least one mechanically expansible member interposed between said rotor body and shaft for maintaining said rotor body concentric with said shaft when the assembly is subjected to elevated temperatures and the rotor body expands to a greater extent than the shaft.

3. A rotor assembly comprising a shaft, a separately formed rotor body mounted on said shaft for rotation therewith, said rotor body being formed of a material having a higher coefficient of thermal expansion than that of said shaft, and means including a pair of mechanically expansible members interposed between said rotor body and shaft and displaceable in response to the difference in thermal expansion of said elements for maintaining said rotor body concentric with said shaft when the assembly is subjected to elevated temperatures and the rotor body expands to a greater extent than the shaft.

4. A rotor assembly comprising a shaft, a separately formed rotor body mounted on said shaft for rotation therewith, said rotor body being formed of a material having a higher coefficient of thermal expansion than that of said shaft, and means for maintaining said rotor body concentric with said shaft when the assembly is subjected to elevated temperatures and the rotor body expands to a greater extent than said shaft, said means including elements rotatable with said shaft forming a pair of axially spaced, oppositely inclined shoulders extending divergently from the axis of said shaft, an annular portion of said rotor body projecting radially inwardly between said shoulders, and a pair of expansible rings interposed between and in contact with both said shoulders and the adjacent edges of said annular portion of the rotor body.

5. A rotor assembly comprising a shaft, a separately formed rotor body mounted on said shaft for rotation therewith, said rotor body being formed of a material having a higher coefficient of thermal expansion than that of said shaft, and means for maintaining said rotor body concentric with said shaft when the assembly is subjected to elevated temperatures and the rotor body expands to a greater extent than said shaft, said means including elements rotatable with said shaft forming a pair of axially spaced, oppositely inclined shoulders extending divergently from the axis of said shaft, an annular portion of said rotor body projecting radially inwardly between said shoulders, the edges of said annular portion being perpendicular to the axis of said shaft, and a pair of split rings of triangular cross section interposed between and in contact with both said shoulders and the adjacent edges of said annular portion of the rotor body.

6. In a rotor assembly of the type including a shaft and a separately formed rotor body mounted on said shaft for rotation therewith, said rotor body being formed of a material having a higher coefficient of thermal expansion than that of said shaft, a self-centering connection between the shaft and rotor body effective to maintain the rotative balance of the assembly when subjected to elevated temperatures comprising means forming an inclined shoulder on said shaft, a sleeve on said shaft having a shoulder thereon of the same inclination as that on said shaft but sloping in the opposite direction and axially spaced therefrom, an annular portion of said rotor body projecting radially inwardly between said shoulders, and a pair of expansible members substantially filling the spaces between said shoulders and the adjacent edges of said annular portion of the rotor body when the rotor assembly is cool.

7. In a rotor assembly of the type including a shaft and a separately formed rotor body mounted on said shaft for rotation therewith, said rotor body being formed of a material having a higher coefficient of thermal expansion than that of said shaft, a self-centering connection between the shaft and rotor body effective to maintain the rotative balance of the assembly when subjected to elevated temperatures comprising means forming an inclined shoulder on said shaft, a sleeve on said shaft having a shoulder thereon of the same inclination as that on said shaft but sloping in the opposite direction and axially spaced therefrom, an annular portion of said rotor body projecting radially inwardly between said shoulders and in contact with said shaft when the rotor assembly is cool, the edges of said annular portion being perpendicular to the axis of said shaft, and a pair of split rings substantially filling the spaces between said shoulders and the adjacent edges of said annular portion of the rotor body.

8. A self-centering connection between the shaft and rotor body of a rotor assembly as defined in claim 7 wherein the angle of inclination of said shoulders is such that the tangent of said angle is substantially equal to the ratio between the diameter of the shaft between said shoulders and the axial length of said annular portion of the rotor body.

9. A self-centering connection between the shaft and rotor body of a rotor assembly as defined in claim 7 wherein said sleeve and split rings are made of material having a coefficient of thermal expansion not greater than that of the rotor body and at least equal to that of said shaft.

10. A self-centering connection between the shaft and rotor body of a rotor assembly as defined in claim 7 wherein said sleeve and split rings are made of the same material as said shaft.

11. In a rotor assembly of the type including a shaft and a separately formed rotor body mounted on said shaft for rotation therewith, said rotor body being formed of a material having a higher coefficient of thermal expansion than that of said shaft, a self-centering connection between the shaft and rotor body effective to maintain the rotative balance of the assembly when subjected to elevated temperatures comprising a shaft portion of reduced diameter, an inclined shoulder formed on said shaft between said reduced portion and the remainder thereof, a sleeve on said reduced shaft portion axially spaced from said shoulder and having a shoulder on the end thereof of the same inclination as said first named shoulder but sloping in the opposite direction, an internal collar on said rotor body projecting radially inwardly between said shoulders and having a relatively tight fit on said reduced shaft portion at normal temperatures, and a pair of split rings interposed between and in contact with both said shoulders and the adjacent edges of said collar.

12. In a rotor assembly of the type including a shaft and a separately formed rotor body mounted on said shaft for rotation therewith, said rotor body being formed of a material having a higher coefficient of thermal expansion than that of said shaft, a self-centering connection between the shaft and rotor body effective to maintain the rotative balance of the assembly when subjected to elevated temperatures comprising a portion of reduced diameter at one end of said shaft, an inclined shoulder formed on said shaft between said reduced portion and the remainder thereof, a sleeve on said reduced shaft portion axially spaced from said shoulder and having a shoulder on the end thereof of the same inclination as said first named shoulder but sloping in the opposite direction, an internal collar at the end of said rotor body surrounding the reduced shaft portion, said collar projecting radially inwardly between said shoulders and having a relatively tight fit on said reduced shaft portion at normal temperatures, a pair of split rings interposed between and in contact with both said shoulders and the adjacent edges of said collar, and a nut on the outer end of said reduced shaft portion for holding said rotor body, shaft, sleeve and split rings in assembled, relatively non-rotatable relationship.

GILBERT RATHMAN.

References Cited in the file of this patent

UNITED STATES PATENTS

| Number | Name | Date |
|---|---|---|
| 2,442,254 | Whitfield | May 25, 1948 |